United States Patent
Prinz et al.

(10) Patent No.: US 11,465,283 B2
(45) Date of Patent: Oct. 11, 2022

(54) METHOD OF PROTECTING HUMANS IN AN ENVIRONMENT OF A MOVING MACHINE

(71) Applicant: SICK AG, Waldkirch (DE)

(72) Inventors: Oliver Prinz, Waldkirch (DE); Christoph Hofmann, Waldkirch (DE)

(73) Assignee: SICK AG, Waldkirch (DE)

( * ) Notice: Subject to any disclaimer, the term of this patent is extended or adjusted under 35 U.S.C. 154(b) by 287 days.

(21) Appl. No.: 16/598,101

(22) Filed: Oct. 10, 2019

(65) Prior Publication Data
US 2020/0122329 A1    Apr. 23, 2020

(30) Foreign Application Priority Data
Oct. 17, 2018 (DE) .......................... 102018125736.8

(51) Int. Cl.
*B25J 9/16* (2006.01)
*G01S 7/41* (2006.01)
(Continued)

(52) U.S. Cl.
CPC ........... *B25J 9/1666* (2013.01); *B25J 9/1694* (2013.01); *G01S 7/024* (2013.01); *G01S 7/411* (2013.01);
(Continued)

(58) Field of Classification Search
CPC ...... B25J 9/1666; B25J 9/1694; B25J 9/1674; B25J 9/1676; F16P 3/147; F16P 3/12;
(Continued)

(56) References Cited

U.S. PATENT DOCUMENTS 6,342,696 B1    1/2002  Chadwick
6,426,716 B1    7/2002  McEwan
(Continued)

FOREIGN PATENT DOCUMENTS

DE    19649618 A1    6/1998
DE    19700811 A1    7/1998
(Continued)

OTHER PUBLICATIONS

Lazarte, Maria "Robots and Humans Can Work Together with New ISO Guidance"; International Organization for Standardization; Mar. 8, 2016.
(Continued)

*Primary Examiner* — Abby Y Lin
*Assistant Examiner* — Karston G. Evans
(74) *Attorney, Agent, or Firm* — Nath, Goldberg & Meyer; Jerald L. Meyer; Morgan D. Rosenberg (57) ABSTRACT

A method of protecting humans in an environment of a moving machine is provided that comprises the environment being monitored by means of a protective device that is configured to detect one or more kinematic parameters of a respective object located in the environment and controlling the moving machine in dependence on detected kinematic parameters of the respective object to initiate a protective measure. The protective equipment here detects the polarization properties and a movement modulation of the respective object in dependence on which the respective object is classified with respect to whether the respective object is a human. In particular only when the respective object was classified as a human, the protective equipment controls the moving machine to initiate the protective measure in dependence on detected kinematic parameters of this respective object.

17 Claims, 3 Drawing Sheets

(51) Int. Cl.
*G01S 13/88* (2006.01)
*G01S 13/93* (2020.01)
*G01S 7/02* (2006.01)
*G01N 22/00* (2006.01)

(52) U.S. Cl.
CPC ............ *G01S 7/415* (2013.01); *G01S 13/881* (2013.01); *G01S 13/93* (2013.01); *G01N 22/00* (2013.01)

(58) Field of Classification Search
CPC ... G01V 3/12; G01V 8/10; G01V 8/12; G01N 21/00; G01N 22/00; G01S 7/024; G01S 7/411; G01S 7/415; G01S 13/881; G01S 13/93
See application file for complete search history.

(56) References Cited

U.S. PATENT DOCUMENTS

| | | | | |
|---|---|---|---|---|
| 10,162,075 | B2* | 12/2018 | Kuznetsov | G01V 3/12 |
| 11,354,880 | B2* | 6/2022 | Shaver | H04B 10/614 |
| 2009/0021598 | A1* | 1/2009 | McLean | G01J 3/447 |
| | | | | 348/222.1 |
| 2010/0321229 | A1* | 12/2010 | Dwelly | G01S 7/415 |
| | | | | 342/28 |
| 2014/0067121 | A1* | 3/2014 | Brooks | B25J 9/1676 |
| | | | | 700/255 |
| 2015/0332463 | A1* | 11/2015 | Galera | G06K 9/00201 |
| | | | | 382/103 |
| 2019/0363430 | A1* | 11/2019 | Wang | G01S 7/024 |
| 2020/0072764 | A1* | 3/2020 | Vacanti | G01S 7/026 |
| 2020/0284694 | A1* | 9/2020 | Scott | G01M 7/00 |
| 2021/0247505 | A1* | 8/2021 | Sarma | G01S 7/4913 |

FOREIGN PATENT DOCUMENTS

| | | | | |
|---|---|---|---|---|
| DE | 69725637 | T2 | 5/2004 | |
| DE | 102004030144 | A1 * | 1/2006 | ............ B25J 9/1697 |
| DE | 102005003024 | B4 | 4/2010 | |
| DE | 102015002283 | A1 * | 11/2015 | ............ G01S 17/42 |
| DE | 102015112656 | A1 | 2/2017 | |
| EP | 1947377 | A1 | 7/2008 | |
| EP | 2944985 | A1 | 11/2015 | |
| EP | 3527332 | A1 | 8/2019 | |
| WO | 2008028871 | A1 | 3/2008 | |
| WO | 2011072924 | A1 | 6/2011 | |

OTHER PUBLICATIONS

ISO 13849; Wikipedia; Retrieved from http://en.wikipedia.org/w/index.php?title=ISO_13849&oldid=887556692; Mar. 13, 2019.

* cited by examiner

METHOD OF PROTECTING HUMANS IN AN ENVIRONMENT OF A MOVING MACHINE

FIELD

The present invention relates to a method of protecting humans in an environment of a moving machine, in particular within the framework of a human-robot collaboration, that comprises the environment being monitored by means of protective equipment that is configured to detect one or more kinematic parameters of a respective object located in the environment and controlling the moving machine in dependence on detected kinematic parameters of the respective object to initiate a protective measure. The invention further relates to protective equipment for a moving machine that is configured for carrying out such a method and to a moving machine having at least one such piece of protective equipment.

BACKGROUND

Different work can be carried out by moving machines such as robots in industrial surroundings. This in particular relates to work in which especially large forces have to be exerted and/or which is to be carried out repeatedly at a high speed and with high precision. Other work can be carried out better by humans. This in particular relates to work that can be difficult to automate, for instance because it requires experience and/or a high adaptation capability. In processes that comprise both work of the one kind and work of the other kind, it is therefore expedient if humans and moving machines collaborate to combine their respective strengths as efficiently as possible.

However, high demands on the safety of the involved humans result for such a human-robot collaboration (HRC) since the involved moving machines can in particular represent a hazard for the humans due to their force and their speed. Precautions therefore have to be taken to preclude injuries to humans where possible. Such precautions comprise both passive measures, for example that hard and sharp edges at the outer side of the moving machine are avoided, and rather soft and/or rounded surfaces are provided, and active safety mechanisms that trigger specific safety measures in the event of a hazard for a human to avert said hazard. For example, a tool can be provided at a free end of a robot arm that serves the machining of a workpiece, but that could also injure a human; however, due to its function it cannot be configured in a less dangerous manner. To nevertheless preclude a hazard as much as possible, it can be expedient to ensure that said tool can always only be operated at a specific safety distance from humans that are present.

Safety demands on industrial robots, in particular on collaborating robots, are defined in the standards ISO 10218-1:2011, ISO 10218-2:2011, and in particular in the technical specification ISO/TS 15066:2016. In a human-robot collaboration, robots collaborate with humans in a defined working environment without being permanently spatially separated from one another by a separating apparatus. A hazard can in particular result here for a human participating in the collaboration in that a movement of the moving machine hits a human. This hazard can be combated in different manners in accordance with said specifications.

One possibility comprises the moving machine only being operated under the direct control of a human who can thus himself ensure that neither he nor other humans are injured by the moving machine. If the control of the moving machine takes place automatically, in contrast, or if the moving machine even works autonomously, the safety of the humans collaborating with the moving machine can be ensured in accordance with a further safeguarding concept that the movements of the moving machine, in particular its force and speed, are limited such that on a collision with the machine, a human will himself very probably not suffer any pain or injury. Such a safety concept based on a limitation of the moving machine is, however, only possible if the work for which the moving machine is used does not require any high forces or high speeds.

In accordance with an alternative safeguarding concept, the focus is on no contact at all taking place between a human and a moving machine, at least for as long as the latter is in operation. It is ensured for this purpose that the moving machine can only be taken into operation when there is no human in a defined environment of the moving machine and is immediately stopped as soon as a human penetrates into the defined environment. This environment can in particular be defined by a safety distance from the machine or from a tool of the machine and can in this respect be static or also dynamic if the environment is defined relative to a moving element of the moving machine. The environment is constantly monitored in this respect (at least in operation of the moving machine) so that the presence of a human in the environment can be immediately reacted to.

Provision is made in accordance with an expansion of this safeguarding concept that a distinction is not only made binarily between a released operation of the moving machine with a completely free environment and an immediate enforced stop as soon as a human is present in the environment, but rather that a stepped or continuous transition takes place. For this purpose, on the approach of a human to the moving machine, its movements are not immediately stopped as a protective measure, but are rather first only reduced, in particular slowed down. This can take place continuously so that the movements become ever slower and/or weaker on an increasing approach. The movement reduction takes place in this process such that it is ensured that the moving machine has adopted a safe operating state at the latest briefly before a contact with a human, has in particular either come to a complete stop or still only carries out movements from which a risk of pain or injuries to the respective human no longer results.

It is important for the implementation of such a safety concept to precisely detect the presence and preferably also the movements of humans in the surroundings of the machine to be able to adapt the movements of the moving machine thereto. The separation distance of a human from the moving machine and the speed at which the human moves toward the moving machine are in particular important parameters for how much the movements of the moving machine should be reduced. This safety concept is therefore also called "speed and separation monitoring" (SSM).

The separation distance and the speed of an object can generally be detected in different manners. However, a difficulty can result in that a plurality of further objects, that may be moving objects under certain circumstances, possibly also one or more further moving machines, can be present in the working zone in which the moving machine collaborates with one or more humans. Objects that are actually in a fixed position can also show movements in this respect, e.g. vibrating machines.

Such objects can make the monitoring of the surroundings of a moving machine more difficult if its position and movement are equally detected like the positions and movements of humans present in the surroundings and are taken into account for the decision on the triggering of protective measures. This not only applies because such non-human objects do not form the focus of a safeguarding concept for the protection of humans and therefore at least do not have to be taken into account within the framework of such a safeguarding concept, but also because under certain circumstances the objects are objects for which a collision with the moving machine can already be precluded for other reasons, for instance because the object is admittedly moving, but can anyway not depart from a spatial zone that is outside the radius of movement of the moving machine.

It is an object of the invention to provide a method of the initially named kind of protecting humans in an environment of a moving machine, to provide protective equipment for a moving machine that is configured to carry out such a method, and to provide a moving machine having at least one such piece of protective equipment that can in particular be used to implement a so-called speed and separation monitoring in a particularly efficient and reliable manner.

SUMMARY

The method in accordance with the invention comprises the environment of the moving machine to be secured being monitored by means of protective equipment. This protective equipment can in particular be electrosensitive protective equipment (ESPE). The protective equipment is configured to detect one or more kinematic parameters of a respective object present in the environment. The kinematic parameters are in particular the location, the speed, and/or the acceleration of the respective object. It can be advantageous in this process to detect these values in each case completely in three spatial dimensions. This is, however, not compulsory. It can rather e.g. be sufficient only to detect the separation distance of the respective object from the moving machine as the location, only to detect a speed component in the direction toward the moving machine as the speed, and/or to detect the acceleration in this direction as the acceleration. Objects of any desired kind can generally be detectable by means of the protective equipment and kinematic parameters of both one or more humans and of one or more non-human objects can in particular thereby be detected in the environment of the moving machine.

The protective equipment is furthermore configured to control the moving machine to initiate a protective measure in dependence on detected kinematic parameters of the respective object. The protective measure can comprise movements of the moving machine being reduced, that is in particular being slowed down and/or reduced in force, or also being completely stopped. Such a protective measure does not necessarily have to relate to the whole moving machine, but can rather be restricted to a part of the machine from which a hazard for a human can specifically emanate, e.g. to a tool at the end of a robot arm.

A respective protective measure can, for example, be carried out on a falling below of a specific safety distance of the respective object from the moving machine. The protective measures preferably increase as the separation distance decreases, for instance in that the movements are reduced the more, the closer the respective object comes to the moving machine. The increase can be continuous or stepped here, e.g. by a provision of staggered safety distances.

The detected speed and/or the detected acceleration of the respective object, in particular in the direction toward the moving machine, can be used in addition to the detected location or separation distance to include expectations derived therefrom with respect to the future location or separation distance of the respective object in the decision on the carrying out of a protective measure. Provision can, for example, be made that movements of the moving machine are reduced the more, the faster the respective object moves toward the moving machine or the greater the acceleration of the respective object toward the moving machine. Conversely, the reduction in movement can be smaller if the respective object moves at less speed and/or in a decelerating manner toward the movement machine than if it moves at high speed and/or in an accelerating manner toward the moving machine.

The reference point at the moving machine for the measurement of the location, in particular of the separation distance, of the speed, and/or of the acceleration, is here ideally that part of the moving machine from which a hazard emanates. The protective equipment is preferably attached in its vicinity so that it can at least approximately itself be used as the reference point. It can, however, be expedient here to compensate the difference resulting therefrom as much as possible by way of calculation.

Provision is furthermore made in accordance with the invention that the protective equipment detects polarization properties and a movement modulation of the respective object. While the protective equipment is therefore, as described above, only generally configured to detect kinematic parameters of a respective object and to take them into account on a decision on the triggering of a protective measure, it is essential to the method that at least polarization properties and a movement modulation of a respective object present in the environment of the moving machine are specifically detected by means of the protective equipment. The protective equipment preferably detects the polarization properties and the movement modulation in addition to kinematic properties of the respective object. It is, however, not absolutely necessary that the same protective equipment that detects the polarization properties and the movement modulation also detects kinematic parameters of the respective object.

A movement modulation is in particular present when a measured value detected from the respective object has a modulation caused by a movement of the respective object. A change in the measured value that corresponds to a specific pattern in particular represents such a modulation. The modulation can, for example, be characterized by one or more characteristic frequencies and, optionally, by a characteristic distribution of the frequencies. Said detection of the movement modulation of a respective object can here also comprise determining as the result of the detection that no movement modulation is present for the respective object, for instance because it is a static object.

Provision is furthermore made in accordance with the invention that the respective object is classified in dependence on both the detected polarization properties and on the detected movement modulation with respect to whether the respective object is a human. In addition to the detection of measured data that can be relevant with respect to protective measures to be taken, a classification of the respective object from which these measured data were logged also takes place. Such a classification makes it possible not to use the detected measurement data without distinction for the decision on the triggering of protective measures, but rather to have the kind of the respective object specifically enter into the decision, e.g. in that the measurement data are weighted or are also completely eliminated depending on the kind of the respective object. Provision can additionally be made that kinematic parameters are only detected at all of objects of a certain kind, in particular only of objects that were classified as human, while the detection of kinematic parameters for other objects can be dispensed with for reasons of efficiency.

Finally, in particular only when the respective object was classified as human, the method in accordance with the invention comprises the projective equipment controlling the moving machine to initiate a protective measure in dependence on detected kinematic parameters of this respective object. Provision can in particular be made here to control the moving machine to initiate a respective protective measure in dependence on the location and on the speed of the moving object relative to the moving machine. These parameters can then advantageously be taken into account on a monitoring of speed-dependent safety distances in the manner of speed and separation monitoring.

The method in accordance with the invention opens up the possibility of completely removing objects of which it can be assumed that they are not human in each case on the monitoring of a moving machine or to at least take them into account separately as less relevant or as relevant in a different manner. Specific threshold values can, for example, be defined for the relevance. The threshold values can here depend on a respective classification likelihood (fidelity). If the respective object was classified as a human, a complete and comprehensive consideration preferably takes place. This means that kinematic parameters of the respective object, that is of the respective human, are detected and the control of the moving machine to initiate possibly required protective measures in dependence on these detected kinematic parameters takes place. For this purpose, the kinematic parameters of the respective object classified as a human, however, do not necessarily have to be detected by means of the same protective equipment that also detected the polarization properties and the movement modulation.

Furthermore, the detection of the kinematic parameters of a respective object can also respectively depend on the result of the classification of this object so that, for example, kinematic parameters are only detected in every case from an object classified as a human. Both the efficiency of the monitoring of the moving machine and the calculation efficiency of the protective equipment (and/or of a sensor of the protective equipment) and thus its energy consumption can be substantially improved. Provision can, however, alternatively also be made that the detection of kinematic parameters of the objects in the environment of the moving machine is independent of the result of the classification and in particular takes place before carrying out the classification, e.g. simultaneously with the detection of the polarization properties and of the movement modulation of a respective object. In this manner, kinematic parameters are admittedly also logged from objects that are ultimately not classified as human and that are then under certain circumstances not further required for the decision on the triggering of protective measures. However, the kinematic parameters of a respective object can thereby be used in addition to its polarization properties and movement modulation for support or as additional criteria in the classification of the respective object, whereby the reliability of the classification can be further improved.

The detection of the polarization properties can in particular comprise a change of the polarization of electromagnetic radiation being detected on a reflection of the electromagnetic radiation at the respective object. To this extent, the polarization properties of a respective object comprise its property of changing the polarization of electromagnetic radiation on reflection at the respective object. This property substantially depends on the material of the respective object. In this respect, it is applicable to a number of kinds of objects that the polarization of electromagnetic radiation is not maintained on reflection at the respective object. If, however, electromagnetic radiation is reflected perpendicular at a metal surface, its polarization is maintained. The polarization is also at least not completely canceled, but only modified, at other angles of incidence on reflection at a metal surface, e.g. linearly polarized light can be reflected as elliptically polarized light. In particular metal objects can be distinguished from non-metal objects due to these effects. It can therefore be a requirement for the classification of a respective object as a human that the detected polarization properties do not correspond to those of a metal object.

The detection of the movement modulation can in particular comprise a time progression of the speed of the respective object being detected and a modulation being identified in the progression. A change of the speed in accordance with a specific, preferably a predefined or predefinable, pattern can in particular represent such a modulation if such a change is present in this detected time progression.

It can be expedient for the detection of the speed progression to track the respective object in said environment of the moving machine. Such a tracking can, for example, take place with reference to additionally detected kinematic parameters of the respective object. The speed can then be tracked over a specific time period or also continuously while the respective object is tracked. In this manner, a time progression of the speed can be detected within which a modulation is then identified. In the same way as the detection of the movement modulation can lead to the result that no movement modulation is present, said identification of the modulation likewise comprises the possibility in this respect that it is not possible to recognize a characteristic modulation or any modulation at all in the time progression.

Provision is made in accordance with an embodiment of the method that the protective equipment classifies the respective object as a human when, on the one hand, the detected polarization properties of the respective object do not correspond to polarization properties to be expected for a non-human object, in particular for metal, but are not to be expected for a human, and when, on the other hand, the detected movement modulation of the respective object corresponds to a movement modulation that is to be expected for a human. In other words, the classification of the respective object takes place with reference to at least two criteria:

On the one hand, the detected polarization properties are evaluated. However, the attempt is not made in this process to positively identify a human with reference to the polarization properties. It is rather only checked whether the polarization properties do not contradict the fact that the respective object is a human. A check can in particular be made whether the polarization properties are those of a metal since metals, unlike many non-metallic objects, are able to at least partly maintain the polarization of reflected light. It can therefore only be negatively detected whether a human can be excluded with reference to the polarization properties with respect to the classification of the respective object.

On the other hand, the detected movement evaluation is evaluated. It is known here that moving humans cause characteristic movement modulations, e.g. while walking, that can be measured. The determination whether such a movement modulation characteristic for a human is present can in particular take place using an evaluation of frequencies of the movement. The movement modulation can, for example, be subjected to a Fourier analysis for this purpose. An alternative or supplementary possibility of evaluation comprises analyzing the movement modulation with reference to neural networks with respect to whether they are based on a movement, e.g. walking, typical for a human. It can thus be positively determined with reference to the evaluation of the movement modulation whether the respective object is a human.

Both criteria are here naturally each subject to a certain uncertainty that can also differ depending on the measurement situation. The negative evaluation with reference to the polarization properties and the positive evaluation with reference to the movement modulation are therefore taken into account in combination. The classification preferably only produces the result that the respective object is a human when both the detected polarization properties do not contradict it and the detected movement modulation are indicative of it.

Provision is made in accordance with a further embodiment of the method that the protective equipment detects the polarization properties and the movement modulation of the respective object by means of the same sensor. The sensor can in particular be part of the protective equipment. The method can be carried out particularly efficiently and the protective equipment can be particularly compact thanks to this embodiment. The sensor is preferably suitable both to transmit electromagnetic radiation and to receive electromagnetic radiation, for instance in that it comprises one or more radiation sources and one or more detectors. The polarization properties and the movement modulation can thus each be detected from comparisons between the transmitted electromagnetic radiation and the electromagnetic radiation reflected by the respective object. Said sensor can in particular be a radar sensor or a lidar sensor. However, different sensors can generally also be considered that can transmit and receive electromagnetic radiation.

The detection of the movement modulation can in this respect comprise the detection of a time progression of the speed of the respective object and thus like it be based on the detection of a Doppler shift between the transmitted electromagnetic radiation and the electromagnetic radiation reflected by the respective object e.g. on radar or lidar, that is on a frequency shift dependent on the relative speed of the reflective object. The detection of the movement modulation can generally also be based on different signals than electromagnetic radiation, e.g. on acoustic waves, in particular on ultrasound. In this respect, signals having a high carrier frequency are advantageous since the Doppler frequency increases as the carrier frequency increases.

The polarization properties can in particular be detected in that said sensor either has one polarized radiation source and two detectors polarized orthogonally to one another or two orthogonally polarized radiation sources and one polarized detector. A polarized radiation source can in this respect be formed by the combination of a common radiation source with a polarizer If two polarized radiation sources are provided, they can also be formed by two combinations of the same radiation source with two different polarizers. The same applies accordingly to the polarized detectors.

In both cases, the polarization properties can each be determined from the relationship $R=\log(P_{co}/P_{cross})$ of the powers that are transmitted between a respective radiation source and a respective detector when they are copolarized ($P_{co}$) or that are transmitted between a respective radiation source and a respective detector when they are cross-polarized ($P_{cross}$). If the polarized radiation is reflected at a metal surface of the respective object, a large portion of the power is received in copolarized form, while in the ideal case no power is transmitted in cross-polarized form. A metal can thus be recognized with reference to this connection and a human can consequently be excluded as necessary.

In an embodiment having two polarized radiation sources, it is expedient when the radiation sources transmit the respective differently polarized electromagnetic radiation after one another, in particular alternately, to be able to reliably detect the copolarized and the cross-polarized power transmission by means of one single detector. In an embodiment having a single polarized radiation source and two orthogonally polarized detectors, in contrast, the copolarized portion and the cross-polarized portion can be detected in parallel.

Provision is made in accordance with an advantageous further development of the method that the protective equipment also detects one or more kinematic parameters of the respective object, in particular at least its location and/or its speed, in addition to the polarization properties and the movement modulation by means of said sensor. This is in particular possible by means of a radar sensor or a lidar sensor. The protective equipment can thus generally have only one single sensor to carry out the total method for a monitoring of the environment of the moving machine. The detection of kinematic parameters of the respective object can, however, also take place by means of a different senor than the sensor used for the detection of the polarization properties and of the movement modulation. In this case, the protective equipment comprises at least one separate further sensor beside said sensor.

It can generally be sufficient for the respective kinematic parameters only to be detected in a radial direction, that is in a direction toward the moving machine or toward the respective sensor and for the spatial angles to be neglected. The respective kinematic parameters can, however, also be detected more exhaustively, in particular completely in three dimensions. To be able to measure is a specific direction, a radar sensor can, for example, be used having at least one transmission antenna that irradiates microwave radiation into the total space or at least into a spatial zone and having at least one reception antenna that receives reflected microwave radiation in a specific direction. The reception antenna can be configured as a so-called phased array antenna for this purpose. Provision can generally also be conversely made that the transmission antenna is configured as a phased array antenna and transmits in a specific direction, with the reception antenna then being able to receive in a specific direction.

Provision is further made in accordance with a further advantageous embodiment, that the protective equipment detects the polarization properties and/or the movement modulation of the respective object by means of at least one further sensor whose measurement principle differs from that of said sensor, in particular by means of an optical sensor. In other words, at least either the polarization properties or the movement modulation, preferably both, are not only detected by means of the one said sensor, but rather by means of two sensors, with these two sensors differing with respect to their respective measurement principle. If said sensor is, for example, a radar sensor, the further sensor can in particular be an optical sensor, preferably a lidar sensor. The radar sensor can, for example, be used for detecting both the polarization properties and the movement modulation of the respective object, while the lidar sensor is only used for an additional detection of the polarization properties. A diverse measurement that increases the reliability of the classification of respective objects takes place by the detection of at least one of these two measurement values using two different measurement methods. In accordance with EN ISO 13849, the performance level (PL) of the total system can then advantageously be increased by one level.

Provision can furthermore be made in accordance with a further development of such a method that the protective equipment also detects one or more kinematic parameters of the respective object, in particular at least its location and/or speed, in addition to the polarization properties and/or to the movement modulation by means of the further sensor. Not only the detection of the polarization properties and/or of the movement modulation thus takes place, but also the detection of at least one kinematic parameter of the respective object in a diverse manner. Not only the classification of the respective object thereby becomes more reliable, but also the control of the moving machine for a possibly required protective measure that depends on the detected kinematic properties of the respective object.

The object of the invention is also satisfied by protective equipment for a moving machine that is configured for carrying out a method in accordance with the invention, in particular in accordance with one of the above-described embodiments. The advantageous properties of such protective equipment here in particular result from the advantageous properties of the respective method. The protective equipment can in particular be configured to be arranged in the vicinity of a tool of the moving machine. The protective equipment is for this purpose preferably configured as a construction unit that is in particular delineated toward the outside by a housing. Such protective equipment can be simply arranged at existing moving machines so that a corresponding protective function can be retrofitted in a simple manner to a moving machine.

The protective equipment preferably comprises a sensor that is configured to detect both polarization properties and a movement modulation, preferably also one or more kinematic parameters, of the respective object. In this respect, the polarization properties and the movement modulation as well as optionally the kinematic parameters are detected by the same one sensor. This sensor can in particular be configured as a radar sensor and can comprise a transmission antenna for transmitting microwave radiation having a first polarization and two reception antennas of which one is configured to receive microwave radiation having the first polarization and the other being configured to receive microwave radiation having a second polarization orthogonal to the first polarization. The polarization of the transmission antenna acting as a radiation source and of the reception antennas acting as detectors can here in particular directly result from the alignment of the respective antenna in space so that separate polarizers can be dispensed with.

In accordance with an advantageous further development of the protective equipment, it comprises a further sensor whose measurement principle differs from that of said sensor and that is configured to detect the polarization properties and/or the movement modulation of the respective object. The protective equipment is thus configured by this further sensor to diversely detect the polarization properties and/or the movement modulation. In this respect, the further sensor can in particular be configured as an optical sensor, preferably as a lidar sensor, and can comprise one radiation source for transmitting optical radiation having a first polarization and two optical detectors of which one is configured to receive optical radiation having a first polarization and the other is configured to receive optical radiation having a second polarization orthogonal to the first polarization. The polarization properties of the respective object can in particular be detected diversely in this manner. In addition, the further sensor can also be configured to detect at least one kinematic parameter of the respective object so that, optionally, one or more kinematic parameters can also be diversely detected.

It is furthermore preferred that the sensor and the further sensor are arranged fixedly with respect to one another, in particular in a common housing, to be arranged as a common sensor unit at the moving machine; and wherein the protective equipment preferably has two or more sensor units each having at least one sensor for detecting polarization properties and a movement modulation of a respective object by means of which different zones of the environment of the moving machine are monitored.

By providing such a sensor unit at a moving machine, an environment of the moving machine can be monitored for the presence of humans in a simple manner, but nevertheless reliably and diversely. A sensor unit of the protective equipment, however, does not necessarily have to comprise a sensor and a further sensor, but can also rather have only one single sensor. The protective equipment can furthermore comprise a plurality of sensor units that can be arranged separately from one another at the moving machine. In this manner, a respective different part of the environment of the moving machine and thus an environment of the moving machine that is larger overall can be monitored by means of the different sensor units. The sensor units are here preferably arranged such that the environment to be monitored is completely covered in as gapless a manner as possible.

Since the protective equipment can control the moving machine to initiate a protective measure in dependence on kinematic parameters of one or more objects respectively classified as human in the environment of the moving machine, the protective equipment makes possible a safe use of the moving machine within the framework off a human-robot collaboration.

Provision can furthermore be made that the protective equipment has two or more sensor units respectively having at least one sensor for detecting polarization properties and a movement modulation of a respective object, by means of which different zones of the environment of the moving machine can be monitored. These zones, that correspond to fields of view of the respective sensor units, can overlap in part to ensure that no unmonitored gaps remain between adjacent zones. A zone about the moving machine or about a hazardous part of the moving machine that is larger overall can thus be secured by the plurality of sensor units.

Provision can, for example, be made that the sensor units are arranged distributed, in particular regularly distributed, about a tool that is provided at an end of a robot arm. If the zones that are monitored by the different sensor units overlap, it may be necessary to be able to distinguish the radiation transmitted by different sensor units for an unambiguous association. For this purpose, sensor units whose monitored zones overlap can be controlled in a coordinated manner to transmit radiation only temporally separate from one another. Since the detection of the polarization properties, of the movement modulation, and/or of the one or more kinematic parameters can take place in a respectively pulsed manner, the pulses of the sensor unit can be phase-shifted so that the sensor units do not transmit radiation simultaneously, but rather alternately, for example. Alternatively or additionally to such a temporal separation, a separation of the frequencies can be provided in that at least those respective different sensor units whose monitored zones overlap transmit radiation of different frequencies or different frequency ranges, in particular disjunctive frequency ranges. The frequencies or frequency ranges are here preferably so separate that, despite possible frequency shifts, a received radiation can be respectively unambiguously associated with the sensor unit from which it originates.

The object of the invention is furthermore satisfied by a moving machine having at least one pieces of protective equipment in accordance with the invention, in particular having a piece of protective equipment in accordance with any one of the above-described embodiments. The moving machine can in particular be a robot.

BRIEF DESCRIPTION OF THE DRAWINGS

The invention will be further described in the following only by way of example with reference to the Figures.

DETAILED DESCRIPTION

Figure 1:
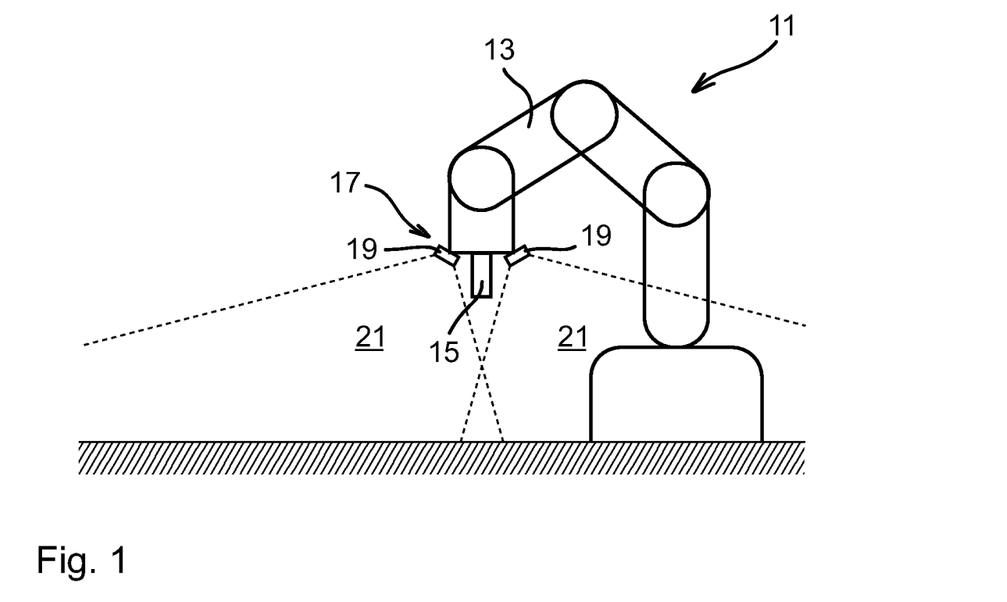
FIG. 1 shows in a schematic representation a moving machine having protective equipment that is configured to carry out the method in accordance with the invention of protecting humans in an environment of the moving machine.

A greatly simplified schematic representation of a moving machine 11 in accordance with the invention, which is a robot, is shown in FIG. 1. The moving machine 11 comprises an articulated robot arm 13 at whose free end a tool 15 is provided for gripping or for processing a workpiece, not shown. The tool 15 can be flexibly positioned in the surroundings of the moving machine 11 by moving the robot arm 13. Since a hazard for humans present in the surroundings can emanate from the tool 15, the surroundings of the moving machine 11 are monitored in accordance with the safeguarding concept of speed and separation monitoring to enable a human-robot collaboration (step 100 in FIG. 5).

The moving machine 11 has protective equipment 17 in accordance with the invention for this purpose. The protective equipment 17 comprises a plurality of sensor units 19 that substantially correspond to one another, that are in particular of the same design, and that are arranged distributed around the tool 15 at the free end of the robot arm 13. Two sensor units 19 arranged diametrically with respect to the tool 15 are shown in the schematic representation. The protective equipment 17 is configured to carry out a method in accordance with the invention of protecting humans in the environment of the moving machine 11. The sensor units 19 for this purpose monitor a respective different part of the environment of the moving machine 11 that corresponds to their respective fields of view 21. The fields of view 21 of different sensor units 19 overlap in part here. To cover the surroundings of the moving machine 11 to be monitored as comprehensively as possible, more than the shown two sensor units 19 can also be provided.

Figure 5:
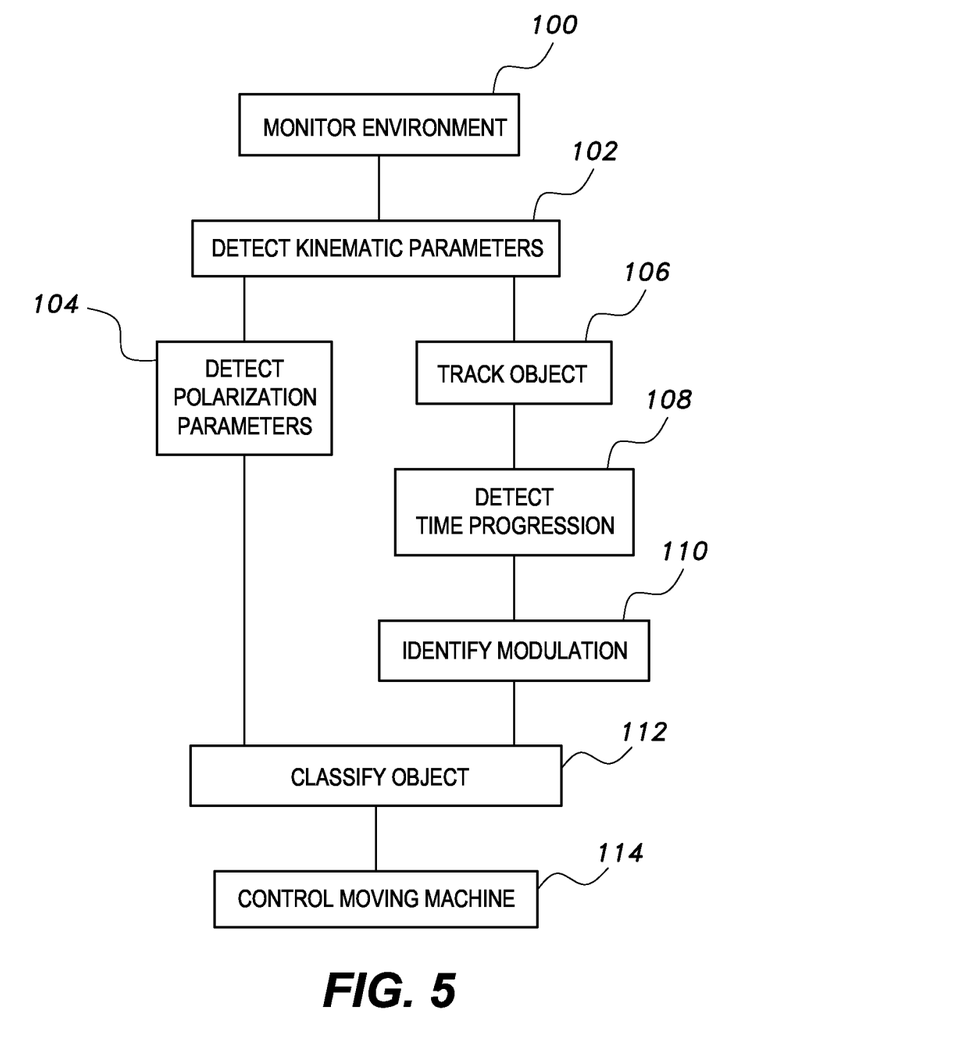
FIG. 5 is a flowchart illustrating method steps of the method of protecting humans in an environment of a moving machine.

Kinematic parameters of a respective object (not shown) that is just present in the field of view 21 of a respective sensor unit 19 can be detected by means of the sensor units 19 of the protective equipment 17 (step 102 in FIG. 5). The protective equipment 17 can then, for example by means of an evaluation and control unit, not shown, control the moving machine 11 to initiate a protective measure in dependence on the detected kinematic parameters (step 114 in FIG. 5). The method carried out by the protective equipment in this respect makes it possible that the result of a classification of the respective object with respect to whether the respective object is a human is also taken into account for the control of the moving machine 11 to initiate a protective measure. For this purpose, respective polarization properties (step 104 in FIG. 5) and a movement modulation of the respective object (steps 106, 108 and 110 in FIG. 5) are detected by means of the sensor units 19 with reference to which said classification of the respective object then takes place (step 112 in FIG. 5).

The movement modulation is detected in that a respective object is tracked on its movement within the environment of the moving machine 11 (step 106 in FIG. 5) and its speed is measured in this process (step 108 in FIG. 5). In this respect, the speeds, which may be different under certain circumstances, of different parts of the respective object (e.g. arms and legs of a walking person) are detected together. The speeds can in particular be measured using the speed-dependent Doppler shift of the radiation reflected at the respective object. A frequency progression can be formed from the continuously detected speeds by transformation into the frequency space (step 108 in FIG. 5, said frequency progression having a modulation such as is shown in FIG. 2 and that represents a movement modulation 23 in the sense of the present application (step 110 in FIG. 5).

Figure 2:
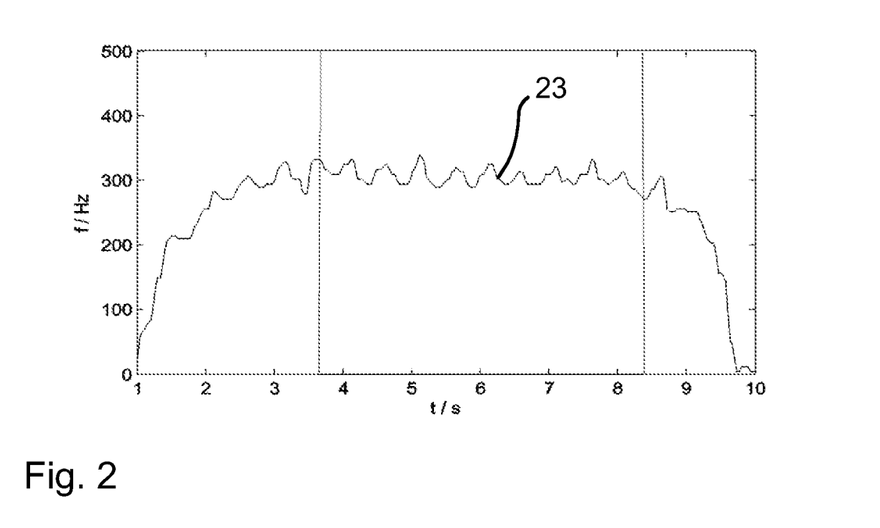
FIG. 2 shows an example for a movement modulation detected within the framework of the method in accordance with the invention.

The movement modulation 23 shown in FIG. 2 is a typical pattern for the frequencies of a human movement that differs in a characteristic manner from the movement of a standing or moved non-human object. It is here the movement of a walking human. In a middle range that is bounded by two vertical lines in FIG. 2, the detected Doppler frequency is at approximately 300 Hz, which corresponds to the general movement speed of the detected human in the corresponding time period. The frequency here has a sinus-like oscillation superposed. This additional modulation results from the fact that a human does not move as a rigid body, but in particular the arms, legs and upper body also move relative to one another when walking, with these relative movements following a typical regular movement sequence. The detection of a movement modulation 23 that has a corresponding pattern to the movement modulation 23 shown in FIG. 2 therefore represents an indication that the detected object is a human. The detection of a movement modulation 23 of a respective object can thus be used as a criterion for the classification of the respective object with respect to whether the respective object is a human.

A transformation into the frequency space can be expedient for the evaluation of a detected movement modulation 23 since specific patterns can be better recognized in the frequency space. Such a transformation does not, however, necessarily have to take place. Alternatively, detected signal progressions that may contain a movement modulation 23 can also be evaluated directly, e.g. with the aid of correspondingly trained neural networks. In addition, movement modulations 23 that are detected from non-human objects can also be used in a supplementary manner. Detected movement modulations 23 of vibrating, non-human objects can, for example, be used to recognize these objects again at a later point in time. Such objects, in particular also their respective positions in the surroundings of the robot, can thus be detected within the framework of a calibration trip of a robot, for instance, and can be used later by recognizing the objects again as references, in particular in the manner of spatial markers.

Figure 3:
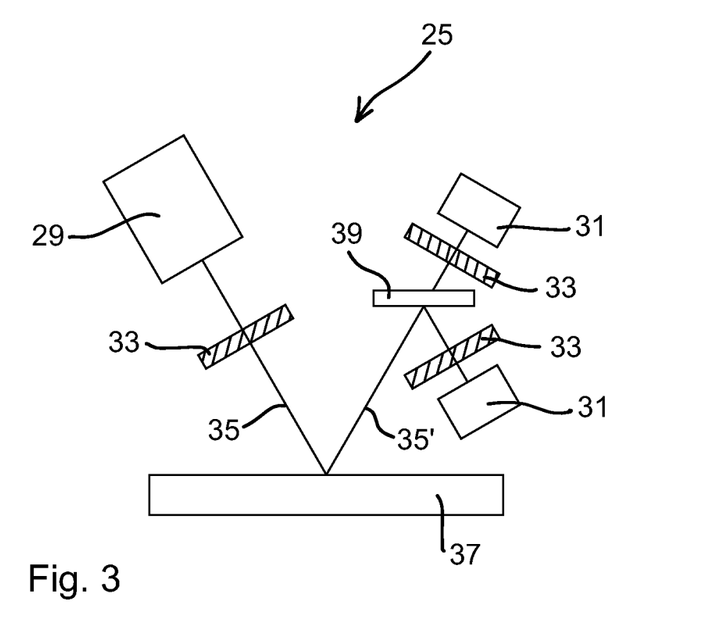
FIG. 3 shows a sensor of protective equipment in accordance with the invention in accordance with a first embodiment.
Figure 4:
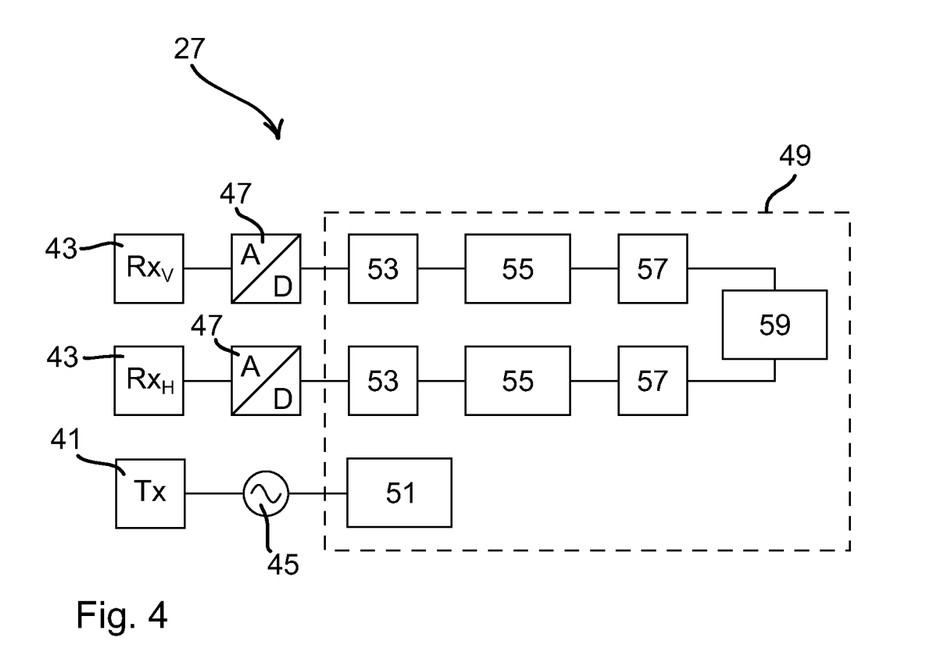
FIG. 4 shows a sensor of protective equipment in accordance with the invention in accordance with a second embodiment.

The sensor units 19 preferably each comprise an optical sensor, in particular a lidar sensor 25 such as is shown schematically in FIG. 3 and a radar sensor 27 such as is shown schematically in FIG. 4. The combination of two sensors that are based on different measurement principles for the measurement of the same measurement value, in particular of said polarization properties and/or of the movement modulation 23 of the respective object enables a diverse and thus particularly reliable monitoring of the environment. The sensor units 19 of the embodiment shown in FIG. 1 here each have a housing in which both sensors 25, 27 are received together.

The lidar sensor 25 shown in FIG. 3 comprises a radiation source 29, in particular a laser, and two optical detectors 31. The radiation source 29 and the two detectors 31 each have a polarizer 33 in the form of a filter that only transmits linearly polarized radiation in a specific direction. Of the two polarizers 33 that belong to the two detectors 31, one is copolarized and the other is cross-polarized here relative to the polarizer 33 of the radiation source 29. The radiation source 29 is configured for this purpose to transmit radiation 35 that is linearly polarized by the polarizer 33 of the radiation source 29, In the schematic representation of FIG. 3, the radiation 35 is incident on a metal surface 37 and is reflected by it. The radiation 35 can, however, generally be at least partly reflected by any respective object so that a portion of the reflected radiation 35' moves in the direction back to the lidar sensor 25, in particular to its detectors 31.

The reflected radiation 35' is preferably directed in equal portions onto the two detectors 31 by means of a beam splitter 39, with said reflected radiation 35' respectively having to pass through the associated polarizer 33. The copolarized portion can in this manner be detected by means of the one detector 31 and the cross-polarized portion of the reflected radiation 35' is detected by means of the other detector 31. The polarization of the reflected radiation 35' can then be determined from this and can in particular form a relationship that can be used as a characteristic for the polarization properties of the respective object at which the radiation 35 was reflected. On reflection at a metal surface 37, the polarization of the radiation 35 can admittedly change, e.g. become elliptical, which can then be determined with reference to the two detectors 31. The effects of a reflection at a metal surface 37 on the polarization o the radiation 35, however, differ substantially from those of a reflection at a non-metallic surface at which as a rule the reflected radiation 35' no longer has any defined polarization. It can therefore optionally be determined with reference to the detected polarization properties of a respective object that the respective object has a metal surface 37 and is consequently not a human. It should admittedly not be possible to positively identify a respective object as a human with reference to its polarization properties. However, in conjunction with at least one other criterion that, in particular like said movement modulation 23, permits a positive determination, the polarization properties can contribute to a reliable classification.

The radar sensor 27 shown in a schematic representation in FIG. 4 is configured in a generally corresponding manner to the lidar sensor 25 shown in FIG. 3. The radar sensor 27 comprises one transmission antenna 41 that is correspondingly aligned for transmitting horizontally or vertically polarized microwave radiation and two reception antennas 43 of which one is aligned for receiving horizontally polarized radiation and the other is aligned for receiving vertically polarized radiation. The reception antennas 43 can be configured as phased array antennas for a direction-specific detection of reflected microwave radiation. The transmission antenna is supplied with voltage by a voltage source 45 for transmitting signals. Signals received at the reception antennas 43 are digitized by means of two analog-to-digital converters 47 that are associated with a respective reception antenna 43.

The signals to be transmitted by the transmission antenna 41 and the signals received by the reception antennas 43 are generated or evaluated on the digital plane by means of a digital signal processing 49 that comprises different modules 51-59 These modules 51-59 can be configured as separate program modules or can also be defined purely functionally. The module 51 serves for the signal generation and controls the voltage source 45 in a corresponding manner. The signals received by the reception antennas 43 and digitized by the analog-to-digital converters 47 are each initially preprocessed by a module 53 and then run through a time-frequency transformation in module 55. The module 57 subsequently respectively serves for the detection of specific patterns, in particular of a movement modulation 23 typical for a human, in the respective signals. The signals received over the two different reception antennas 43 are finally furthermore set into relation with one another in a further module 59 to therefrom determine the polarization of the reflected microwave radiation and to determine the polarization properties of the respective object that reflected the radiation. The digital signal processing 49 can furthermore comprise further modules to furthermore also determine kinematic parameters on the basis of the received signals, in particular the location and/or speed of the respective object.

Since at least the polarization properties, optionally also kinematic parameters of the respective object, are detected in two different manners, namely both by means of the lidar sensor 25 and by means of the radar sensor 27, that are combined to one sensor unit 19, the protective equipment 17 is diverse in this respect. This enables a particularly reliable detection of the respective measurement values. In addition, since the respective object is first classified as a human or as a non-human object before protective measures are triggered in dependence on the result of this classification and on kinematic parameters of the respective object, the moving machine 11 can particularly specifically protect humans and can be comparatively efficient in so doing.

REFERENCE NUMERALS 11 moving machine
13 robot arm
15 tool
17 protective equipment
19 sensor unit
21 field of view
23 movement modulation
25 lidar sensor
27 radar sensor
29 radiation source
31 detector
33 polarizer
35, 35' radiation
37 metal surface
39 beam splitter 41 transmission antenna
43 reception antenna
45 voltage source
47 analog-to-digital converter
49 digital signal processing
51-59 module

The invention claimed is:

1. A method of protecting humans in an environment of a moving machine, said method comprising:
    monitoring the environment by means of protective equipment that is configured to detect one or more kinematic parameters of a respective object present in the environment and to control the moving machine in dependence on the detected kinematic parameters of the respective object to initiate a protective measure;
    detecting polarization properties and a time progression of a speed of the respective object, wherein the detecting is performed by the protective equipment, and wherein the protective equipment comprises a sensor for performing the detecting of the polarization properties and the time progression of the speed of the respective object, the protective equipment further comprising a further sensor with a measurement principle differing from a measurement principle of said sensor, the further sensor also detecting the polarization properties of the respective object, the further sensor being configured as an optical sensor and comprising a single radiation source for transmitting optical radiation having a first polarization, and further comprising first and second optical detectors, the first optical detector being configured to receive optical radiation having a first polarization, and the second optical detector being configured to receive optical radiation having a second polarization which is orthogonal to the first polarization;
    classifying the respective object with respect to whether the respective object is a human based on both whether the detected polarization properties correspond to polarization properties characteristic of a human and on whether a change of speed in accordance with a pattern characteristic of a human is present in the detected time progression; and
    controlling the moving machine to initiate the protective measure in dependence on detected kinematic parameters of the respective object, wherein the controlling is performed by the protective equipment.

2. The method in accordance with claim 1,
    wherein said method of protecting humans in said environment of said moving machine takes place within a framework of a human-robot collaboration.

3. The method in accordance with claim 1,
    wherein the protective equipment controls the moving machine to initiate the protective measure only when the respective object was classified as a human.

4. The method in accordance with claim 1,
    wherein the detected kinematic parameters of the respective object comprise the location and speed of the respective object relative to the moving machine.

5. The method in accordance with claim 1,
    wherein the detection of the polarization properties comprises a change of the polarization of electromagnetic radiation being detected on a reflection of the electromagnetic radiation at the respective object.

6. The method in accordance with claim 1,
    wherein the detection of the time progression of the speed comprises:
    tracking the respective object in the environment;
    detecting a time progression of a speed of the respective object; and
    identifying a modulation in the time progression.

7. The method in accordance with claim 1,
    wherein the protective equipment also detects, in addition to the polarization properties and the time progression of the speed, one or more kinematic parameters of the respective object by means of the further sensor.

8. The method in accordance with claim 1,
    wherein the protective equipment detects the polarization properties and the time progression of the speed of the respective object by means of a common sensor.

9. The method in accordance with claim 8,
    wherein the protective equipment detects the polarization properties and the time progression of the speed of the respective object by means of a radar sensor.

10. The method in accordance with claim 9,
    wherein the one or more kinematic parameters of the respective object comprise at least one of its location and its speed.

11. The method in accordance with claim 8,
    wherein the protective equipment also detects, in addition to the polarization properties and the time progression of the speed, the one or more kinematic parameters of the respective object by means of said common sensor.

12. Protective equipment for a moving machine, wherein the protective equipment is configured to carry out a method of protecting humans in an environment of a moving machine, said method comprising:
    monitoring the environment by means of protective equipment that is configured to detect one or more kinematic parameters of a respective object present in the environment and to control the moving machine in dependence on detected kinematic parameters of the respective object to initiate a protective measure;
    detecting polarization properties and a time progression of the speed of the respective object, wherein the detecting is performed by the protective equipment;
    classifying the respective object with respect to whether the respective object is a human based on both whether the detected polarization properties correspond to polarization properties characteristic of a human and on whether a change of speed in accordance with a pattern characteristic of a human is present in the detected time progression; and
    controlling the moving machine to initiate the protective measure in dependence on detected kinematic parameters of the respective object, wherein the controlling is performed by the protective equipment,
    wherein the protective equipment comprises a sensor for performing the detecting of the polarization properties and the time progression of the speed of the respective object,
    wherein the protective equipment further comprises a further sensor with a measurement principle differing from a measurement principle of said sensor, the further sensor also detecting the polarization properties of the respective object, and
    wherein the further sensor is configured as an optical sensor and comprises a single radiation source for transmitting optical radiation having a first polarization, and further comprises first and second optical detectors, the first optical detector being configured to receive optical radiation having a first polarization, and the second optical detector being configured to receive optical radiation having a second polarization which is orthogonal to the first polarization.

13. The protective equipment in accordance with claim 12,
wherein the sensor of the protective equipment is further configured to detect the one or more kinematic parameters of the respective object.

14. The protective equipment in accordance with claim 13,
wherein the sensor is configured as a radar sensor and comprises one transmission antenna for transmitting microwave radiation having a third polarization and two reception antennas of which one is configured to receive microwave radiation having the third polarization and the other being configured to receive microwave radiation having a fourth polarization orthogonal to the third polarization.

15. The protective equipment in accordance with claim 13,
wherein the further sensor is further configured to detect the time progression of the speed of the respective object.

16. The protective equipment in accordance with claim 15,
wherein the sensor and the further sensor are arranged fixedly with respect to one another to be arranged at the moving machine as a common sensor unit.

17. A moving machine having at least one piece of protective equipment, said at least one piece of protective equipment being configured to carry out a method of protecting humans in an environment of a moving machine, said method comprising:
monitoring the environment by means of protective equipment that is configured to detect one or more kinematic parameters of a respective object present in the environment and to control the moving machine in dependence on detected kinematic parameters of the respective object to initiate a protective measure;
detecting polarization properties and a time progression of the speed of the respective object, wherein the detecting is performed by the protective equipment, and wherein the protective equipment comprises a sensor for performing the detecting of the polarization properties and the time progression of the speed of the respective object, the protective equipment further comprising a further sensor with a measurement principle differing from a measurement principle of said sensor, the further sensor also detecting the polarization properties of the respective object, the further sensor being configured as an optical sensor and comprising a single radiation source for transmitting optical radiation having a first polarization, and further comprising first and second optical detectors, the first optical detector being configured to receive optical radiation having a first polarization, and the second optical detector being configured to receive optical radiation having a second polarization which is orthogonal to the first polarization;
classifying the respective object with respect to whether the respective object is a human based on both whether the detected polarization properties correspond to polarization properties characteristic of a human and on whether a change of speed in accordance with a pattern characteristic of a human is present in the detected time progression; and
controlling the moving machine to initiate the protective measure in dependence on detected kinematic parameters of the respective object, wherein the controlling is performed by the protective equipment.

* * * * *